United States Patent
Mamakos

(10) Patent No.: US 8,582,740 B2
(45) Date of Patent: *Nov. 12, 2013

(54) METHOD FOR AUTOMATED MANAGEMENT OF A TELECOMMUNICATION SERVICE

(75) Inventor: Louis Mamakos, Three Springs, PA (US)

(73) Assignee: Vonage Network LLC, Holmdel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,136

(22) Filed: Nov. 18, 2011

(65) Prior Publication Data

US 2012/0063580 A1    Mar. 15, 2012

Related U.S. Application Data

(63) Continuation of application No. 11/645,726, filed on Dec. 27, 2006, now Pat. No. 8,073,123.

(51) Int. Cl.
*H04M 3/42* (2006.01)
*H04L 12/66* (2006.01)

(52) U.S. Cl.
USPC .............. 379/201.02; 370/356; 379/201.12

(58) Field of Classification Search
USPC ........ 370/352–356, 401; 379/201.01, 201.02, 379/201.12
See application file for complete search history.

(56) References Cited

U.S. PATENT DOCUMENTS

| | | | |
|---|---|---|---|
| 4,959,856 A * | 9/1990 | Bischoff et al. | 379/245 |
| 6,829,250 B2 | 12/2004 | Voit et al. | |
| 8,073,123 B2 * | 12/2011 | Mamakos | 379/201.02 |
| 2004/0005045 A1 * | 1/2004 | Adams et al. | 379/201.02 |
| 2004/0047297 A1 * | 3/2004 | Wynn | 370/254 |
| 2006/0008066 A1 * | 1/2006 | Starling et al. | 379/201.03 |
| 2006/0088025 A1 | 4/2006 | Barkley et al. | |
| 2006/0104280 A1 * | 5/2006 | Carolan et al. | 370/393 |
| 2006/0221940 A1 | 10/2006 | Ong et al. | |
| 2006/0268829 A1 | 11/2006 | Nedeltchev | |

FOREIGN PATENT DOCUMENTS

EP    1 337 089 A2    8/2003
WO    WO 2004/093398 A1    10/2004

OTHER PUBLICATIONS

International Preliminary Report on Patentability and Written Opinion dated Jun. 30, 2009 for International Application Serial No. PCT/US2007/023036.

* cited by examiner

*Primary Examiner* — Harry Hong
(74) *Attorney, Agent, or Firm* — Moser Taboada; Joseph Pagnotta

(57) ABSTRACT

Method for automatically managing a telecommunication service. In one embodiments, the method comprises collecting data associated with use of the telecommunication service by a user; determining, based on the data, an activation state associated with the use of the telecommunication service by the user; and executing, based on the activation state, a management process to automatically enable the use of the telecommunication service by the user, wherein the steps of collecting, determining, and executing are automatically performed by a processor of a controller associated with the telecommunication service.

20 Claims, 3 Drawing Sheets

METHOD FOR AUTOMATED MANAGEMENT OF A TELECOMMUNICATION SERVICE

CROSS-REFERENCE TO RELATED APPLICATIONS

This application is a continuation of co-pending U.S. patent application Ser. No. 11/645,726, filed Dec. 27, 2006. The aforementioned related patent application is herein incorporated by reference in its entirety.

FIELD OF THE INVENTION

The invention is related to the field of telecommunication devices and services and more specifically, the invention is directed to a method for automatically managing a telecommunication service based upon the state of a telecommunication device connected thereto.

BACKGROUND OF THE INVENTION

Voice over IP (VoIP) is a recent technological development in the field of telecommunications that is utilized to transmit voice conversations over a data network using the Internet Protocol (IP). Entities (either businesses or individuals) can use VoIP by purchasing and installing the necessary equipment (a Customer Premise Equipment (CPE) device) to access a VoIP service provider and activating this telecommunication service. When such entities begin the activation process, they complete a manually intensive sign-up step to provide subscriber and payment information to the VoIP service provider. This information also includes the service plan (s) the entity desires to purchase and the option to select a phone number from an existing inventory or port their existing phone number to the VoIP service. Since the CPE devices are centrally managed, it is necessary to know with which specific CPE device the subscriber is activating service. Typically, this is accomplished by the subscriber conducting another manually intensive task of entering a CPE device identifier during a web-based transaction in a "self-serve" manner or by communicating the CPE device identifier to a service agent over the phone. To maintain uniqueness, this identifier is typically a long string of digits such as a serial number or a 12 character MAC address (comprising alphanumeric characters (0-9 and A-F)) or any other unique identifier of the CPE device. The entering of these characters can be error prone due to typographical, transcription, transposition errors and the like. Such errors cause delays in completing the activation process, frustration for a new subscriber and increased activity for VoIP service provider agents who could otherwise be assisting other subscribers.

Additionally, after the VoIP service has been activated, there are equipment and account status checks that need to be performed to provide the subscriber with the best possible service. These status checks need to be performed, for example, either on a periodic basis or at every instance of subscriber usage. If it were incumbent upon the subscriber to have to provide either additional information or perform equipment (i.e., software) upgrades during each instance of a status check, such actions would detract from the overall subscriber experience. For example, not all subscribers may be well-versed in computer, Internet or VoIP technology to be able to perform the upgrades and are solely interested in using the telephone as it was intended without further "technology creep" to enjoy the new service.

Therefore, there is a need in the art for a method for automatically managing a telecommunications service so as to reduce the need for customer interaction and service provider resources during use of such a service.

SUMMARY OF THE INVENTION

The present invention generally relates to a method for automatically managing a telecommunication service. In one embodiments, the method comprises collecting data associated with use of the telecommunication service by a user; determining, based on the data, an activation state associated with the use of the telecommunication service by the user; and executing, based on the activation state, a management process to automatically enable the use of the telecommunication service by the user, wherein the steps of collecting, determining, and executing are automatically performed by a processor of a controller associated with the telecommunication service.

BRIEF DESCRIPTION OF THE FIGURES

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

To achieve the desired objectives, the subject invention provides for a method of automatically managing a telecommunication service based upon the analysis and determination of various states of the telecommunication service and a telecommunication device associated therewith. Generally, when a telecommunication service subscriber attempts to establish a connection to the telecommunications service provider, a series of "system checks" are automatically performed and a service management process is automatically started. This service management process performs the necessary operations to reduce administrative steps that the subscriber must perform to initially establish an account with the telecommunication service and subsequently access same. In a preferred embodiment of the invention, the telecommunication service is VoIP that is provided over an IP-based network such as (but not limited to) the Internet and the CPE device is an IP phone (but other similar IPv4- and IPv6-based subscriber end devices are contemplated and considered within the scope of the invention).

Figure 1:
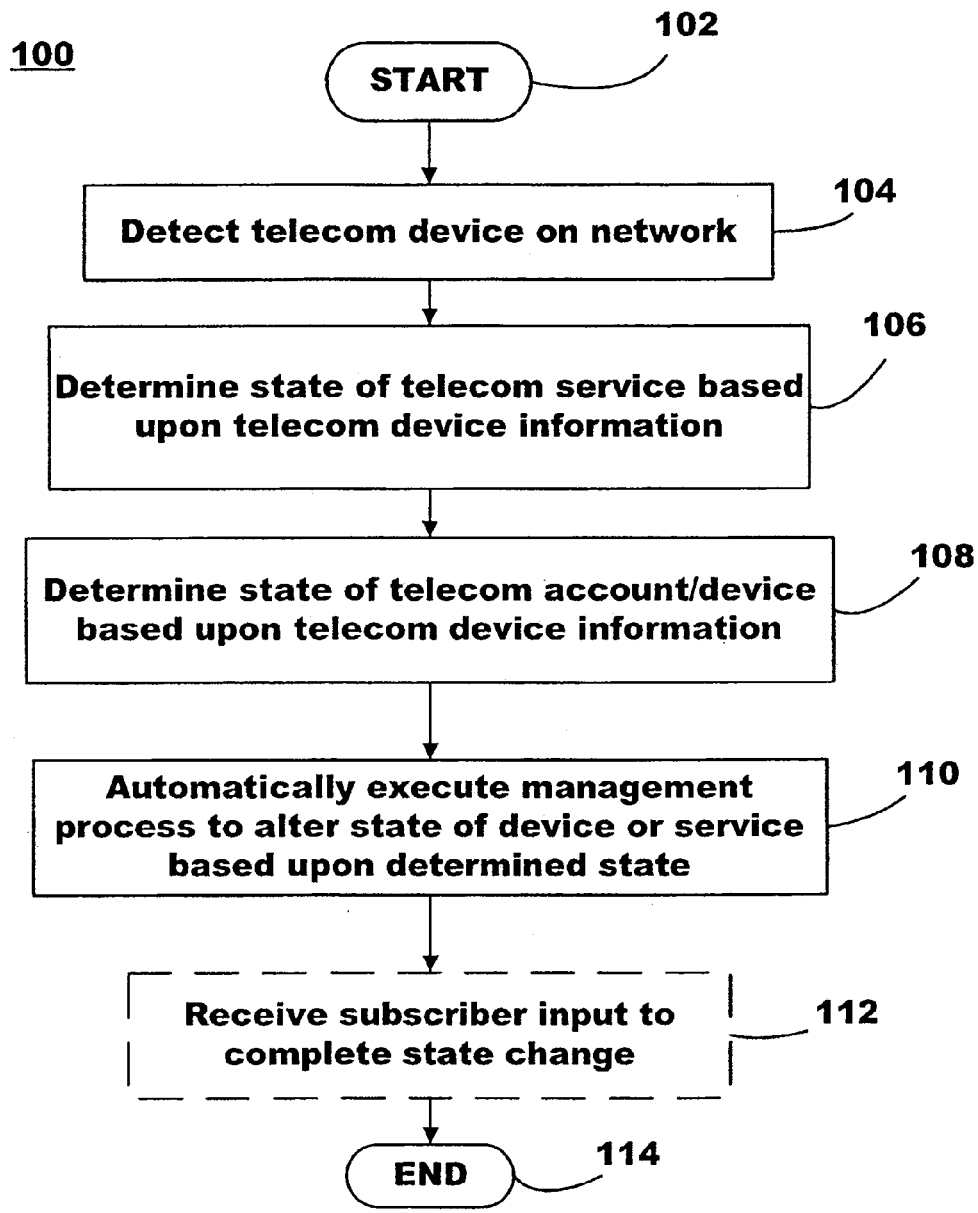
FIG. 1 depicts a sequence of method steps for performing automated management of a telecommunication service according to the subject invention.

The service management process associated with the subject invention is generally seen in FIG. 1 which depicts a series of method steps 100. The method 100 starts at step 102 and proceeds to step 104 where a telecommunication device detection operation is executed. In this step, a CPE device that has been installed or otherwise connected to a subscriber's computer or other similar interface to an IP based network (e.g., the Internet) is recognized. This detection operation is accomplished automatically by, for example, the subscriber's computer as it performs operations including but not limited to routine monitoring of the operating environment, checking for software updates and the like. Alternately, device detection operation is accomplished when the CPE device is connected to the subscriber's computer. One skilled in the art is aware of the exemplary programs, applications, code and the like to perform this detection operation as well as alternate means for executing the detection operation. In one embodiment of the invention, the CPE device is inserted into a USB port of the subscriber's computer which then recognizes the CPE device as a new piece of hardware connected thereto.

At step 106, a determination of the state of the telecommunication service is performed in order to assess what additional steps are necessary to connect the subscriber to the telecommunication service. This determination is accomplished by scanning and analyzing hardware and software on the subscriber's computer and/or the CPE device (i.e., network connectivity, telecommunication service provider and subscriber profiles, default settings, memory contents and the like). This determination indicates what state the telecommunication service associated with the CPE device is in. Details of a first embodiment of this determining step based upon analysis of a non-volatile memory of the CPE device is explained in greater detail below. Alternately, this determining step is performed by analyzing the CPE device, via a CPE device identifier, with the telecommunication service provisioning infrastructure to determine the state of the service. Such a second embodiment of this determining step includes reviewing one or more of the CPE device serial number, MAC address, public key or other generic unique device identifier.

At step 108, a determination of the state of the CPE device and the subscriber's account associated therewith is performed in order to manage the subscriber's account with the telecommunication service. This determination is accomplished by a plurality of possible means for analyzing and/or exchanging information. In one embodiment of the invention, activity of a CPE device configuration file (explained in greater detail below) is monitored. In a second embodiment of the invention, transactions occurring across the network upon which the VoIP service is accessing are monitored so that the telecommunication device is effectively "asking" what state the service is in. Non-limiting examples of such transactions include remote procedure calls, web-based application programming interfaces (API's), Simple Object Access Protocol (SOAP) over XML information and forwarding a subset of subscriber data from the CPE to the telecommunication service.

If the CPE device and/or subscriber account are found to be in a normal, activated/subscribed state, the subscriber is able to access the telecommunication service. If the CPE device and/or subscriber account are found to be in an abnormal state (defined as any state that does not allow normal and typical access to the telecommunication service), then step 108 determines which specific state exists to automatically customize an appropriate response or necessary interaction with the subscriber. The following terms define exemplary conditions or states of either the CPE device or subscriber account that results in the abnormal state in one embodiment of the invention:

Unsubscribed—the CPE device is not associated with an account and unable to be used with the telecommunication service Location Change (assisted)—the telecommunication service analysis indicates that the CPE device's physical location has changed Location Change (autonomous)—the CPE device has determined that its physical location has changed and the subscriber may need to specify an updated location Service in "grace" status—current subscriber account status indicates that payment is past due within a "grace" period where the telecommunication service(s) continue to work, but where intervention by the subscriber is required to take the account out of arrears (i.e., making a payment, updating payment information for automated billing which may have become invalid and the like)

Service in "suspend" status—similar to "grace" status but the grace period has expired and account is in an inactive state where the telecommunication service(s) are suspended or greatly restricted until payment is made current.

Other conditions which may require subscriber interaction are known to those skilled in the art and include but are not limited to for example, a business system which requires updating/confirming of billing information, notification of suspected fraud usage and the like. Such an abnormal state will require further action by the subscriber as explained in detail below. Such action will be of a nature as to provide a straightforward solution to the specific abnormal state rather than the subscriber having to notice the abnormal state, have to undertake a lengthy troubleshooting process to determine the reason for the abnormal state or otherwise wait for technical assistance provided by an agent of the telecommunication service provider.

At step 110, an automated management process is executed to change the state of either the telecommunication service or the subscriber's account based upon the information collected and determined states from steps 106 and 108. In one embodiment of the invention, examples of the information collected are selected from the group consisting of the unique CPE device identification number (i.e., serial number or MAC address), subscriber account number, subscriber user name and updated/newly discovered physical location of the CPE device for confirmation. The automated management process invokes one of a plurality of actions and provides specific and direct instructions or queries, if necessary, to resolve problems resulting in the abnormal state conditions described. Such actions include but are not limited to: launching a web browser on the subscriber's computer to which the CPE device is connected; initiating a communication to an Interactive Voice Response (IVR) service; initiating a communication to a live agent of the telecommunication service provider; initiating an instant-message interactive chat session with a live agent or pre-packaged response system associated with the telecommunication service provider; running a local program to interact with "back-end" systems at the telecommunication service provider and invoking one or more additional programs to initiate password/credential change/update functions. For example, in one embodiment of the invention, a determination is made that the CPE device has never been activated because there is no record of activation from a configuration server (i.e., no configuration file found). Accordingly, the method launches a default web browser on the subscriber's computer by opening a URL to a custom retailer's subscriber page. The URL opened will pass along the CPE device identification number rather than the subscriber manually supplying the information. Such action will ultimately result in the state of the service and the associated device changing from "inactivated" to "activated" so as to allow the subscriber access to the service with little or no subscriber interaction required.

After step 110, the method 100 optionally proceeds to step 112. Step 112 is optional because it introduces a subscriber driven task that may not always be necessary to practice the automatic management process of the subject invention. That is, there are instances of the automatic management process where no response or interaction from the subscriber is required. For example, one such transparent instance is the automatic updating of telecommunications service software at the CPE or subscriber's computer. Such activity requires no interaction with the subscriber and occurs, for example, when the subscriber first accesses the VoIP service to make a new telephone call to another party.

At step 112, if necessary, the method receives instructions from the subscriber to complete the state change. Continuing with the example above, the subscriber completes the remaining portion of the subscription process, activation or other administrative inquiry as necessary with the CPE device in question being implicitly identified. The page being opened can be customized by Device type (since this information is now known from the device identifier data collected earlier in the process). Depending on the design process, this landing page might be customized by the retailer. Alternately, the page may be part of a default configuration returned based upon records of what list of devices (identified by the unique Device Identifier) were shipped to which distribution channels. The URL opened will pass along the Device Identifier to be used as an alternative to the customer manually supplying the information. Other information can also be supplied such as name, address, unique CPE device identification number (i.e., serial number, MAC address, device-specific public key or certificate), DNS name, subscriber account number, subscriber user name, service-associated account identifiers and the like if available to pre-populate the page to further facilitate the subscriber during the automated management process. The method ends at step 114.

Figure 2:
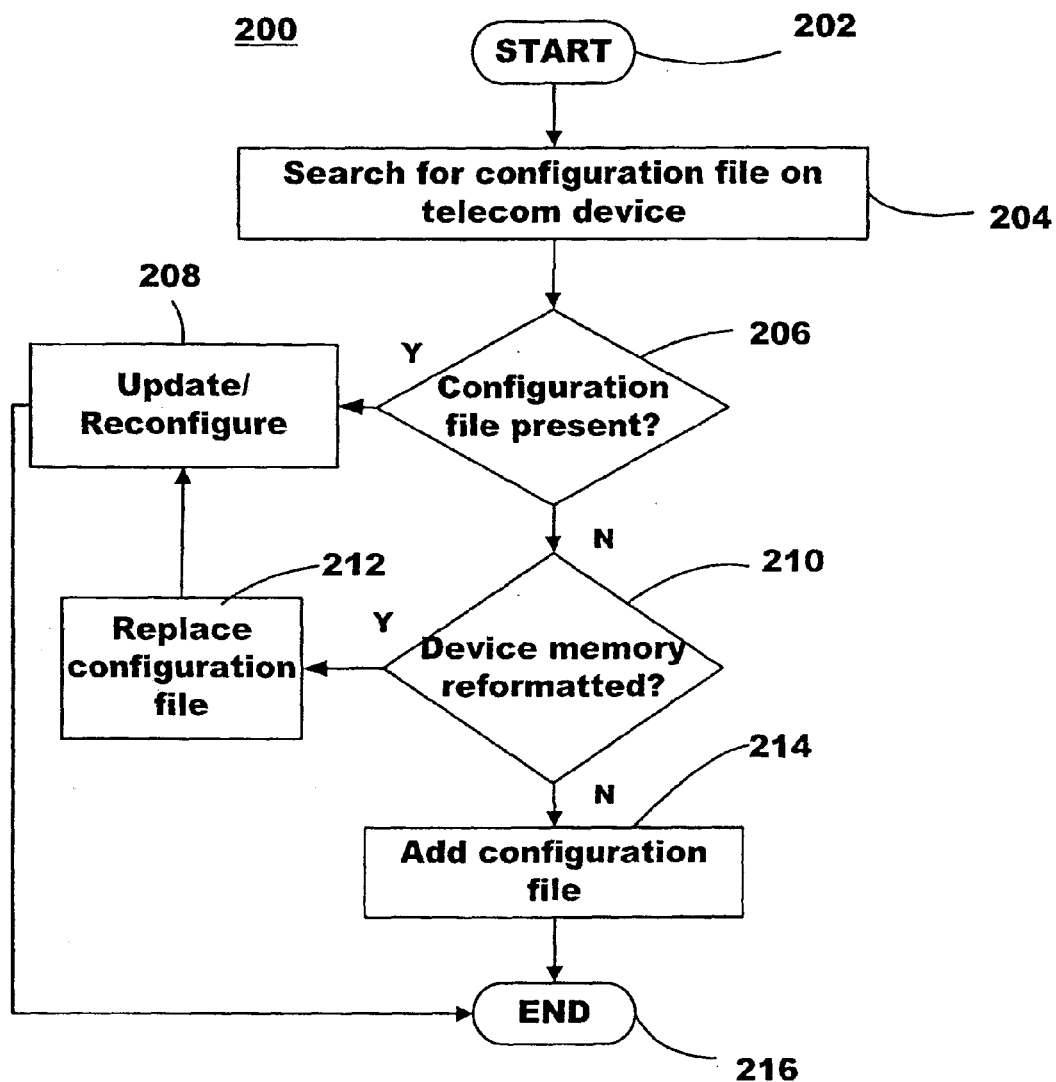
FIG. 2 depicts a sequence of method steps for performing a determining step of the automated management method of the subject invention.

FIG. 2 depicts a series of method steps 200 that describes one type of analysis that is performed to accomplish determining step 106. In one embodiment of the invention, the state of the telecommunication service as presented in step 106 is determined by detecting configuration information in the CPE device. More specifically, the method 200 starts at step 202 and proceeds to step 204 where a search is performed for valid configuration information on the CPE device. After performing the search, the method proceeds to step 206 where a first query is executed to determine if valid, complete and useable configuration information is present. If such configuration information is present (e.g., in a memory, as a file, or some other type of storage component of the CPE device), then the CPE device and associated service are considered "activated" and the subscriber can use the telecommunication service without having to take further administrative action. Accordingly, the method proceeds to step 208 where optional configuration information updating/reconfiguring occurs. This step is optional because depending on existing configuration information or other system parameters, it may not be necessary to update the configuration information. Should it be necessary, the updating/reconfiguring occurs automatically with no subscriber input or action. After the optional configuration updating/reconfiguring, the method 200 ends at step 216.

If there is no valid, complete and useable configuration information present according to the first query step 206, then there is a "null configuration" condition. As such, the method proceeds to step 210 where a second query is executed to determine if the memory in which the configuration information should exist was reformatted, erased or corrupted. If the memory was reformatted, it is assumed that the CPE device and associated service account may have been previously activated and replacement configuration information needs to be installed in the CPE device. Accordingly, the method proceeds to step 212 where a replacement configuration information is installed in the CPE device. The method then proceeds to step 208 where an optional configuration information updating/reconfiguring occurs. This step is optional because depending on replacement configuration information or other system parameters, it may not be necessary to update/reconfigure the replacement configuration information. Should it be necessary, the updating/reconfiguring occurs automatically with no subscriber input or action. After the optional configuration updating, the method 200 ends at step 216.

If the memory was not reformatted, it is assumed that the CPE device and associated telecommunication service were never previously activated. When such an "unactivated" condition is determined, the method proceeds to step 214 where a new configuration information is installed in the CPE device. Adding the configuration information allows the new CPE device the necessary access to the telecommunication service provider to further determine CPE device and subscriber account status as described above with respect to step 108 of method 100. After new configuration information is installed on the new CPE device, the method ends at step 216.

Figure 3:
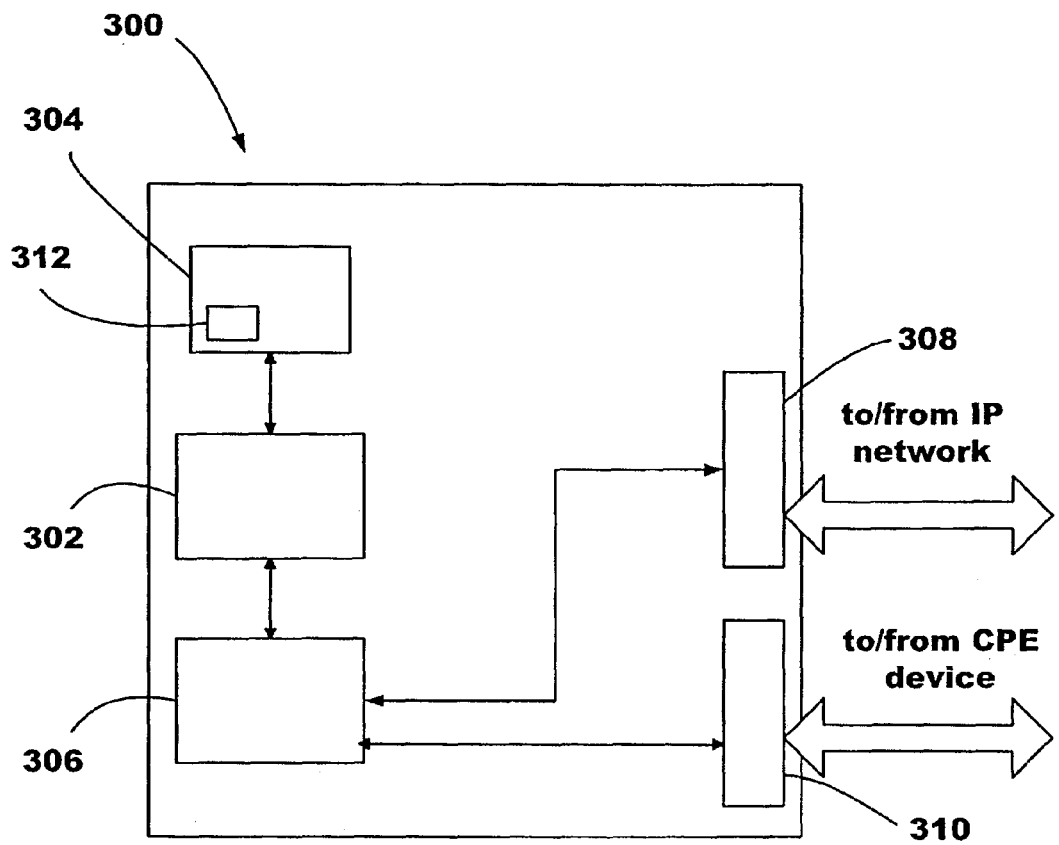
FIG. 3 is a schematic diagram of a controller that may be used to practice the present invention.

FIG. 3 depicts a schematic diagram of a controller 300 that may be used to practice the present invention. The controller 300 may be used to facilitate control of the CPE device or associated subscriber account as described above. The controller 300 may be one of any form of a general purpose computer processor used in accessing an IP-based network such as the Internet. The controller 300 comprises a central processing unit (CPU) 302, a memory 304, and support circuits 306 for the CPU 302 and provisions 308/310 for connecting the controller 300 to an IP-based network and the CPE device to facilitate execution of the automated management process. The memory 304 is coupled to the CPU 302. The memory 304, or computer-readable medium, may be one or more of readily available memory such as random access memory (RAM), read only memory (ROM), floppy disk, hard disk, flash memory or any other form of digital storage, local or remote. The support circuits 306 are coupled to the CPU 302 for supporting the processor in a conventional manner. These circuits include cache, power supplies, clock circuits, input/output circuitry and subsystems, and the like. A software routine 312, when executed by the CPU 302, causes the controller 300 to perform processes of the present invention and is generally stored in the memory 304. The software routine 312 may also be stored and/or executed by a second CPU (not shown) that is remotely located from the hardware being controlled by the CPU 302.

The software routine 312 is executed after the CPE device is connected to the subscriber's computer (e.g., controller 300). The software routine 312, when executed by the CPU 302, transforms the general purpose computer into a specific purpose computer (controller) 300 that controls the automated management process. As such, the process rapidly and easily identifies the telecommunication service and CPE device status and executes a management function as required. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware.

Additionally, the software routine 312 can be used to automatically manage one or more additional services that the telecommunications service provider offers. For example, the software routine 312 (and method 100 in general) is used primarily to automatically manage telecommunication services such as a VoIP service. However, the software routine 312 (and method 100 in general) can also be used to automatically manage an instant messaging (IM) service, an email service or a combination of these services or other services known to those skilled in the art of telecommunications. Further, the software routine 312 can act as a "stand alone" program or can be embedded with one or more other routines or programs that provide one or more additional telecommunication services. The software routine 312 of the present invention is capable of being executed on computer operating systems including but not limited to Microsoft Windows 98, Microsoft Windows XP, Apple OS X and Linux. Similarly, the software routine 312 of the present invention is capable of being performed using CPU architectures including but not limited to Apple Power PC, AMD/Intel x86, Sun SPARC and Intel ARM.

One example of a CPE device that can exploit the advantages of the subject invention is the V-Phone that is manufactured and sold by Vonage™ of Holmdel, N.J. In one example, the method of automatic management process is provided in the V-Phone as the aforementioned software routine 312 written on a flash memory device containing all of the instructions and steps necessary to accomplish, for example, an account activation process, identification of the V-Phone and/or determine the status of the V-Phone or account status associated therewith and any other management tasks contemplated by the invention. Specifically, the V-Phone is provided as a USB-compliant device that, when inserted into the USB port of a computer connected to the Internet, automatically launches the program contained therein. The method then executes a series of steps to identify the V-Phone and its state, connect to the Vonage™ network, provides the necessary updates to the device, service, etc. without relying on subscriber input for intensive tasks such as device identification, mac addressing and the like.

While the foregoing is directed to embodiments of the present invention, other and further embodiments of the invention may be devised without departing from the basic scope thereof, and the scope thereof is determined by the claims that follow.

The invention claimed is:

1. A method for automatically managing a telecommunication service, comprising:
  collecting data associated with use of the telecommunication service by a user of at least one device;
  determining, based on the data, an activation state associated with the use of the telecommunication service by the user of the at least one device; and
  executing, based on the activation state, a management process on the at least one device to automatically enable the use of the telecommunication service by the user by altering a telecommunication service user account status associated with the use of the telecommunication service by the user,
  wherein the steps of collecting, determining, and executing are automatically performed by a processor of a controller associated with the telecommunication service.

2. The method of claim 1, wherein the activation state is for the telecommunication service.

3. The method of claim 2, wherein collecting the data comprises scanning the at least one device associated with the user.

4. The method of claim 3, wherein the at least one device is at least one of a Customer Premise Equipment (CPE) device or an interface to an internet protocol (IP) network.

5. The method of claim 3, wherein the data comprises at least one of network connectivity information, a profile for a provider of the telecommunication service, a profile for the user, a default setting, or memory content.

6. The method of claim 1, wherein the state is for at least one of a Customer Premise Equipment (CPE) device or a user account for the telecommunication service.

7. The method of claim 6, wherein collecting the data comprises monitoring activity of a configuration file of the CPE.

8. The method of claim 6, wherein collecting the data comprises monitoring transactions occurring across a network accessed by the telecommunication service.

9. The method of claim 1, wherein executing the management process comprises changing the state.

10. The method of claim 9, wherein changing the state comprises changing at least one of a Customer Premise Equipment (CPE) state or a telecommunication service state from inactive to active.

11. A non-transitory computer readable medium storing a software program that, when executed by a computer, causes the computer to perform a method for automatically managing a telecommunication service, the method comprising:
  collecting data associated with use of the telecommunication service by a user of at least one device;
  determining, based on the data, an activation state associated with the use of the telecommunication service by the user of the at least one device; and
  executing, based on the activation state, a management process on the at least one device to automatically enable the use of the telecommunication service by the user by altering a telecommunication service user account status associated with the use of the telecommunication service by the user.

12. The computer readable medium of claim 11, wherein the activation state is for the telecommunication service.

13. The computer readable medium of claim 11, wherein collecting the data comprises scanning the at least one device associated with the user.

14. The computer readable medium of claim 13, wherein the at least one device is at least one of a Customer Premise Equipment (CPE) device or an interface to an internet protocol (IP) network.

15. The computer readable medium of claim 13, wherein the data comprises at least one of network connectivity information, a profile for a provider of the telecommunication service, a profile for the user, a default setting, or memory content.

16. The computer readable medium of claim 11, wherein the state is for at least one of a Customer Premise Equipment (CPE) device or a user account for the telecommunication service.

17. The computer readable medium of claim 16, wherein collecting the data comprises monitoring activity of a configuration file of the CPE.

18. The computer readable medium of claim 16, wherein collecting the data comprises monitoring transactions occurring across a network accessed by the telecommunication service.

19. The computer readable medium of claim 11, wherein executing the management process comprises changing the state.

20. The computer readable medium of claim 19, wherein changing the state comprises changing at least one of a Customer Premise Equipment (CPE) state or a telecommunication service state from inactive to active.

* * * * *